Figure 1:
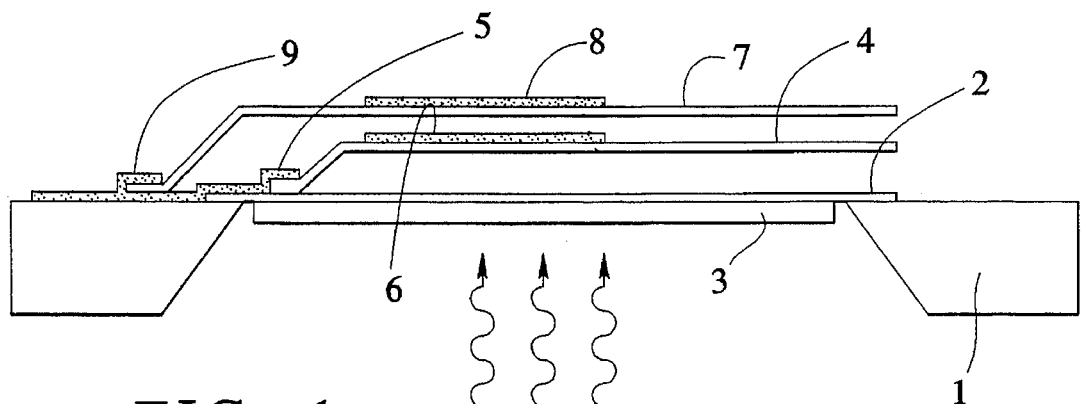

United States Patent [19]
Baert et al.

[11] Patent Number: 5,623,147
[45] Date of Patent: Apr. 22, 1997

[54] RADIATION-SENSITIVE DETECTOR

[75] Inventors: Christian Baert; Jean-Baptiste Chevrier, both of Louvain, Belgium

[73] Assignee: Interuniversitair Micro-Elektronica Centrum VZW, Louvain, Belgium

[21] Appl. No.: 560,027

[22] Filed: Nov. 17, 1995

[30] Foreign Application Priority Data

Nov. 9, 1995 [BE] Belgium ............................... 09401046

[51] Int. Cl.⁶ ..................................................... G01J 5/40
[52] U.S. Cl. ........................................................ 250/338.1
[58] Field of Search .............................. 250/338.1, 336.1; 374/205

[56] References Cited

U.S. PATENT DOCUMENTS 3,415,712  12/1968  Barker, Jr. ............................ 374/205 X
5,265,470  11/1993  Kaiser et al. ...................... 250/338.1 X Primary Examiner—Carolyn E. Fields
Assistant Examiner—Edward J. Glick
Attorney, Agent, or Firm—McDonnell, Boehnen, Hulbert & Berghoff, Ltd.

[57]  ABSTRACT

A device for detecting infrared radiation which comprises a sensitive arm which, over at least a portion of its length, consists of bimetal. One end of said arm is joined to a membrane.

7 Claims, 2 Drawing Sheets

RADIATION-SENSITIVE DETECTOR

A claim of foreign priority under 35 U.S.C. Section 119 is hereby made to priority Belgium application number 09401046 (Nov. 18, 1994) entitled "Radiation-Sensitive Detector," the applicants being BAERT, Christiaan, St.-Jorislaan 9, 3001 Leuven, Belgium (Belgium citizenship), and CHEVRIER, Jean-Baptiste, Lepelstraat 5, 3000 Leuven, Belgium (France citizenship), and the assignee being Interuniversitair Micro-Elektronica Centrum vzw, Kapeldreef 75, 3001 Leuven, Belgium (Belgium citizenship).

The present invention relates to a radiation-sensitive detector based on the bimetal effect and to a method which is advantageous for the use of a detector of this type.

The bimetal effect is known. It utilizes the difference in thermal expansion coefficients of two different bimetal laminae, said difference causing a displacement force which varies as a function of the temperature. This effect has already been used for the measurement of temperatures. U.S. Pat. No. 3,466,449 likewise discloses a thermal relay which comprises two bimetal laminae. More closely to us, the bimetal effect has also been presented in spectrometry (cf. J. L. Gimzewski et al.: Observation of a chemical reaction using a micro-mechanical sensor, Chem. Phys. Letters, Vol. 217, No. 5, 6, Jan. 28, 1994). So far, however, the bimetal effect has never been used for detecting radiation.

The present invention applies the bimetal effect to the detection of radiation. To this end it presents a radiation-sensitive detector. A particular application of the detector according to the invention is infrared image detection.

The detector according to the invention permits not only the detection of radiation with high sensitivity, but the detector according to the invention also has the advantage of the capability of being fabricated by the application of so-called surface micromachining technologies and of the LIGA method.

A further objective of the invention is to present a method for detecting the radiation by using the detector according to the invention and utilizing the characteristics thereof.

The invention is expounded hereinafter in a more detailed manner by means of the appended drawings.

FIG. 1 is a side view of an illustrative embodiment of the detector according to the invention.

Figure 2:
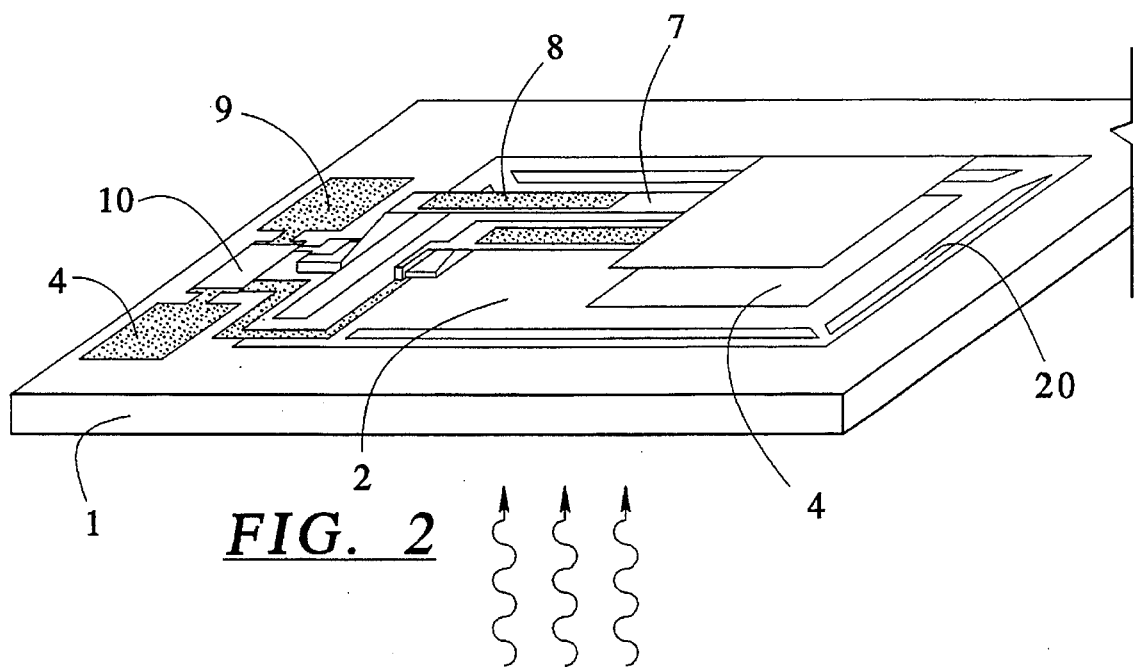

FIG. 2 presents a perspective view of the detector according to FIG. 1.

FIGS. 3 to 9 inclusive present an advantageous method for fabricating a detector according to the invention.

Figure 10:
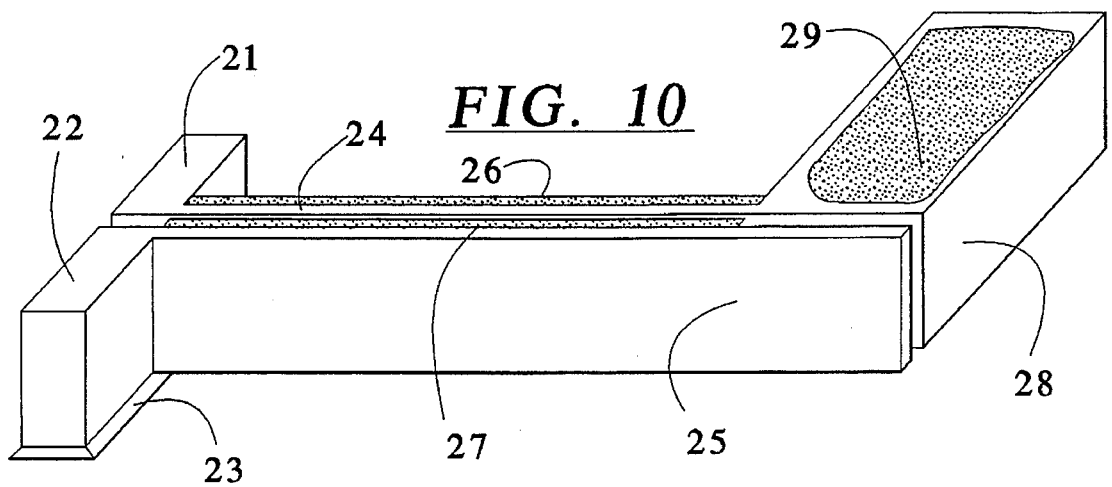

FIG. 10 schematically presents an illustrative embodiment which has been implemented by use of the LIGA method.

The radiation-sensitive detector as presented in FIGS. 1 and 2 comprises a support 1 which, for example, is designed as a rectangular frame within which a thermally insulated membrane 2 is provided, coupled with which there is a radiation-absorbing layer 3. The membrane 2 carries a metallic arm 4 which extends in an overhanging manner. The fixed end of the arm 4 is connected to an electrical contact 5. At least a portion of the arm carries a metal layer 6 which is composed of a metal which differs from that of the arm 4, in order to form a bimetallic arm.

The support 1 also carries a metal arm 7 which extends in an overhanging manner, virtually parallel to the arm 4. The fixed end of the arm 7 is connected to an electrical contact 9. In the example presented in FIG. 1, at least a portion of the arm carriers of the arm 7 carriers a metal layer 8 which is composed of a metal which differs from that of the arm 7, in order thus likewise to form a bimetallic arm. However, as will be seen further on. But if both arms 4 and 7 are made of bimetal, they should be identical.

The arm 4 serves as the sensitive arm, whereas the arm 7 serves as the reference arm. When infrared radiation reaches the absorption layer 3, the latter converts the radiation energy into heat, and the sensitive arm 4 undergoes deformation under the influence of the bimetal effect. It is only the arm 4 which undergoes the influence of the heat which is caused by the incident radiation, whereas the reference arm 7 remains immobile.

Under the influence of the radiation, the free end of the sensitive arm 4 approaches the free end of the reference arm 7 in such a way that the electric capacitance between said two free ends changes as a function of the absorbed energy. Thus the degree of capacitance variation is indicative of the intensity of the incident radiation. Insofar as both arms are made of bimetal and are identical, any temperature change due to the environment in contrast induces a movement which is identical for both arms and consequently does not entail a change in capacitance.

In order to ensure high detection sensistivity, the two metals employed for each bimetal arm must have as different as possible a thermal expansion coefficient, as similar as possible a Young's modulus, and the arms must be as long and thin as possible. Tests have shown that a bimetal having a length of 1 mm and width of ten microns can produce a movement of 1 μm /K at its free end.

The detection of the movement of the sensitive arm by measuring the change in capacitance has the advantage that this measurement does not produce any electronic noise which could impair the performance of the detector.

It should be understood that the detection of the movement of the sensitive arm can be effected in other ways, for example: by varying a tunnel current between a tip attached to the end of the sensitive arm and a fixed electrode, by piezoelectric or resistive effect of an element deposited on the end of the sensitive arm.

The detector according to the invention lends itself eminently to fabrication by surface micromachining technologies or of the LIGA method, which combines lithographic and electrolytic coating techniques. An example of such a method for fabricating the detector according to the invention is presented by FIG. 3 to 9 inclusive.

Figure 3:
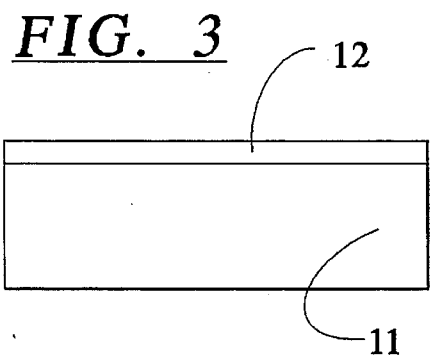
Figure 4:
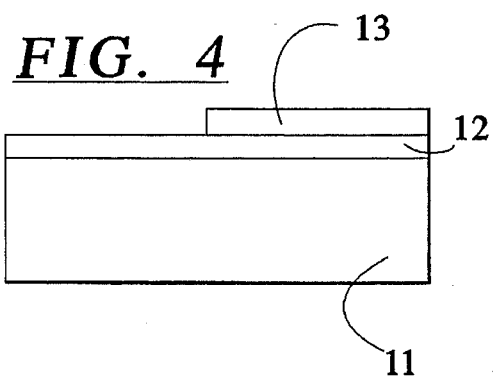
Figure 8:
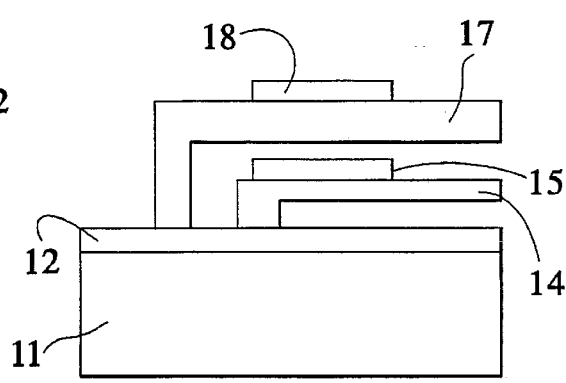

On top of a silicon substrate 11, a layer 12, for example $Si_3N_4$, is deposited which is to serve as a thermally insulating membrane (FIG. 3). After deposition of this layer, holes 20 are etched, in order to permit good thermal insulation after the selective etching of the substrate, which will be carried out later. On top of the layer 12, a so-called sacrificial layer 13 is then deposited, for example silicon oxide $SiO_2$ (FIG. 4).

Figure 6:
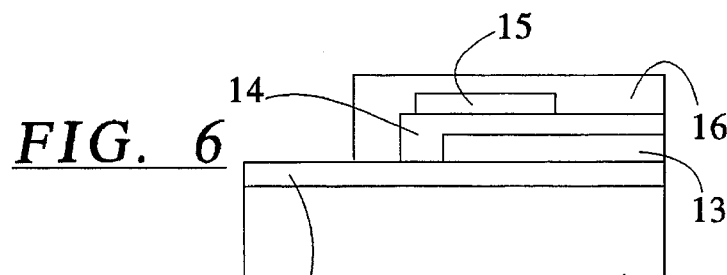
Figure 7:
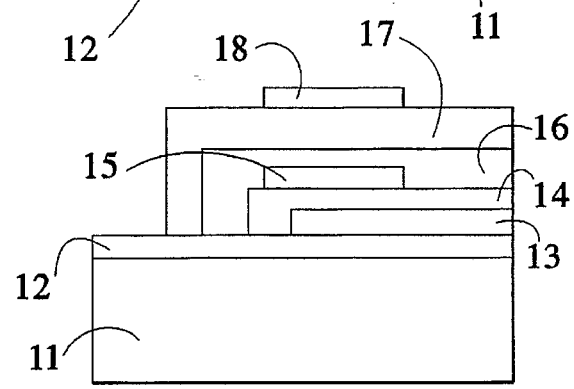
Figure 5:
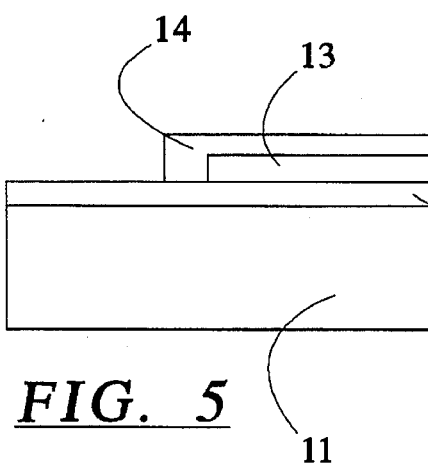
Figure 9:
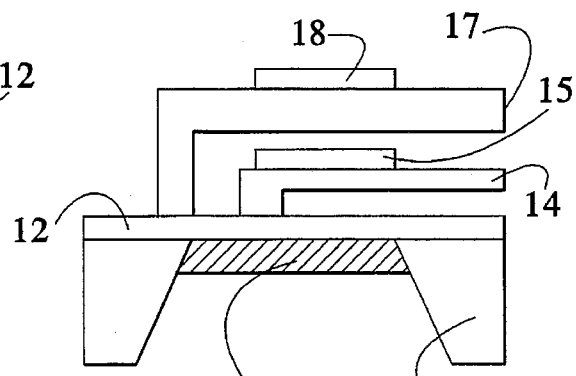

Then a metal layer 14 is deposited which must be part of the sensitive arm (FIG. 5). On top of the metal layer 14, the second metal layer 15 is then deposited, in order to form the first bimetal, and its electrical contact, and then a second sacrificial layer 16 is deposited (FIG. 6). Then the metal layer 17 is deposited which must be part of the reference arm, and then the second metal layer 18, in order to form the reference bimetal and then its electrical contact (FIG. 7). The sacrificial layers are then etched (FIG. 8), after which the substrate 11 is etched selectively from its external surface as far as the membrane 12, and then there is deposited, on the rear surface, an absorption layer 19 (FIG. 9).

An electronic feedback circuit can advantageously be provided on the substrate 11 prior to the forming process, in order to keep constant the capacitance between the free ends of the arms 4 and 7. An electric field is applied between said ends of the two arms, and the feedback circuit (indicated by 10 in FIG. 2) alters the electric field as a function of the radiation in order to keep the capacitance constant. The measurement of the variation of the applied electric field is thus indicative of the intensity of the incident radiation.

In order to enhance the detection sensitivity, the electrodes which form the capacitance could be implemented as "interdigitated" fingers. The body of the electrodes carries projecting portions which extend in a manner so as to alternate between one another.

The detector according to the invention can be implemented in various embodiments. As was reported earlier, it is possible for only the sensitive arm to be composed of bimetal, whereas the reference element is ordinarily metallic. The reference element can then be immobile and be fastened to the support, to which the fixed end of the sensitive arm is likewise fastened.

FIG. 10 presents a perspective view of a radiation-sensitive detector implemented by the LIGA technology. The blocks 21 and 22 are fastened to a support via the base 23. The metallic arms 24 and 25, joined to blocks 21 and 22, respectively, which is composed of a metal differing from the arms. The free end of the arm 24 carries a block 28 covered with a layer 29 which is composed of radiation-absorbing substance. When radiation irradiates the block 29, the arm 24 bends more than the arm 25. The free ends of the arms 24 and 25 form a capacitance. The deformation of the arms under the influence of radiation induces a change in capacitance between the free ends of the arms. This variation of the electric capacitance can be measured by any of the wide variety of measuring circuits, known to those skilled in the art, for measuring the capacitance.

If the bimetallic properties result in the arms deforming by moving apart as a function of the incident radiation, a feedback circuit can be employed in order to keep constant the capacitance between the free ends of the arms. As a result of an electric potential being applied between the arms, these are attracted to one another and the capacitance change due to incident radiation is balanced. If it is possible to keep the arms virtually immobile, the feedback voltage can be employed as a measuring signal which is indicative of the level of the incident radiation.

In the case of the electric potential causing a deflection of the arms as a function of the incident radiation, a further metal lamina can be added on the opposite surface of the arm 24, in order to permit electrostatic attraction in the opposite sense and to serve to keep the arms immobile.

It will be obvious that the invention is not limited to the above-described embodiment and that modifications thereof are possible without moving outside the scope of the invention.

We claim:

1. An infrared radiation-sensitive detector which comprises:

a holder with a radiation-absorbing membrane fastened thereto, a metal reference element which is fastened to the holder, a sensitive arm which, over at least a portion of its length, consists of bimetal, one end thereof being joined to the radiation-absorbing membrane and the other end thereof being free and situated opposite said reference element, in such a way that, when the radiation-absorbing membrane is irradiated by infrared radiation, said sensitive arm warms and moves as a result of the bimetal effect, the electric capacitance between the free end of the sensitive arm and the reference element being altered with the radiation intensity.

2. The radiation-sensitive detector as claimed in claim 1, wherein the reference element is formed by a free end of a reference arm which extends virtually parallel to said sensitive arm.

3. The radiation-sensitive detector as claimed in claim 2, wherein the reference are consists, at least in part, of bimetal identical to the bimetal employed for the sensitive arm.

4. The radiation-sensitive detector as claimed in any one of claims 1–3, wherein the radiation-absorbing membrane consists of a radiation-absorbing layer which is deposited on a thermally insulated membrane.

5. The radiation-sensitive detector as claim in any one of the claims 1–3, wherein the sensitive arm and the reference element are connected to electrical contacts.

6. The radiation-sensitive detector as claimed in claim 5, wherein an electronic feedback circuit is connected between the electrical contacts, in such a way that the electric capacitance between the sensitive arm and the reference element can be kept constant.

7. The radiation-sensitive detector as claimed in any one of claims 1–3, wherein the holder is made from a semiconductor substrate.

* * * * *